(12) United States Patent
Ochsenfeld et al.

(10) Patent No.: US 11,122,889 B2
(45) Date of Patent: Sep. 21, 2021

(54) TABLETOP

(71) Applicant: EinrichtWerk GmbH, Castrop-Rauxel (DE)

(72) Inventors: Gerhard Ochsenfeld, Velbert (DE); Michael Ochsenfeld, Dortmund (DE)

(73) Assignee: Einrichtwerk GmbH, Castrop-Rauxel (DE)

( * ) Notice: Subject to any disclaimer, the term of this patent is extended or adjusted under 35 U.S.C. 154(b) by 10 days.

(21) Appl. No.: 16/644,314

(22) PCT Filed: Dec. 18, 2017

(86) PCT No.: PCT/EP2017/083330
§ 371 (c)(1),
(2) Date: Mar. 4, 2020

(87) PCT Pub. No.: WO2019/048073
PCT Pub. Date: Mar. 14, 2019

(65) Prior Publication Data
US 2020/0187636 A1 Jun. 18, 2020

(30) Foreign Application Priority Data
Sep. 8, 2017 (DE) .......................... 202017105463.2

(51) Int. Cl.
*A47B 13/10* (2006.01)
*B32B 3/00* (2006.01)

(52) U.S. Cl.
CPC ................ *A47B 13/10* (2013.01); *B32B 3/00* (2013.01); *Y10T 428/24* (2015.01)

(58) Field of Classification Search
CPC .............................. Y10T 428/24; A47B 13/10
See application file for complete search history.

(56) References Cited

FOREIGN PATENT DOCUMENTS

| DE | 29617925 U1 | 1/1997 | |
|---|---|---|---|
| FR | 3025079 A1 * | 3/2016 | ............ A47B 13/10 |
| NL | 1027312 C1 | 4/2006 | |

OTHER PUBLICATIONS

PCT International Search Report for correspondence PCT application PCT/EP2017/083330; dated May 25, 2018; 5pp.

* cited by examiner

*Primary Examiner* — Alexander S Thomas
(74) *Attorney, Agent, or Firm* — Adams and Reese LLP; Raymond R. Ferrera

(57) ABSTRACT

The invention relates to a tabletop (6) which, when viewed from above, is a polygon with at least four corners and at least four table edges, wherein two straight lines (7), which extend along two table edges (1, 2), form an angle of 30° relative to each other, two straight lines (8), which run along two table edges (2, 3), form an angle of 60° relative to each other, and two table edges (1, 3) form an angle of 90° relative to each other. Tabletop (6) proposed by the present invention or a corresponding table may on the one hand be used individually, but on the other hand, also offers great flexibility with regard to the arrangement in groups of tables different in number.

10 Claims, 4 Drawing Sheets

6 × 60° = 360°
6

4 × 90° = 360°
4

8

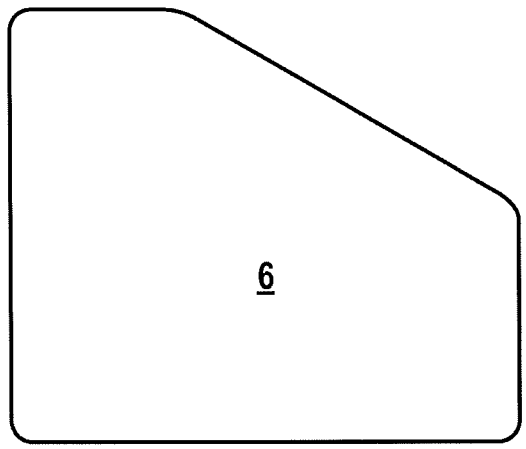
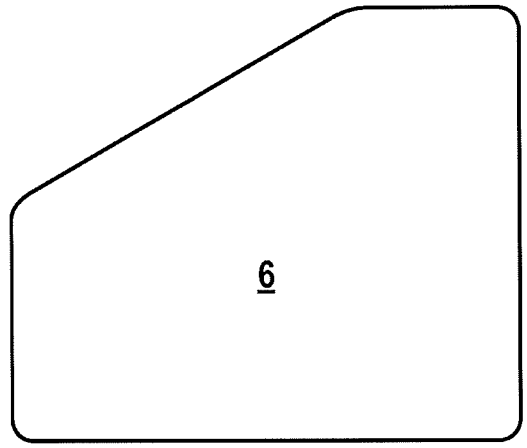
Fig. 8a　　　　　　　　　　Fig. 8b
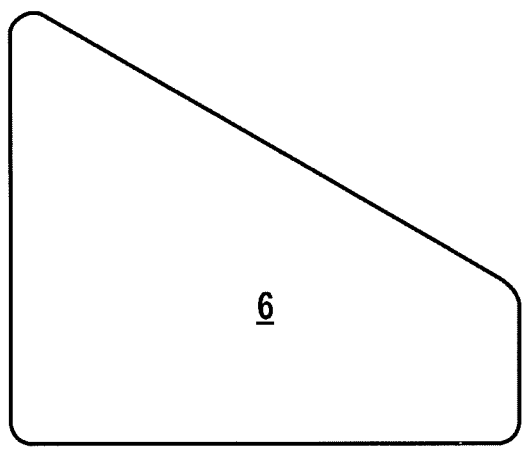
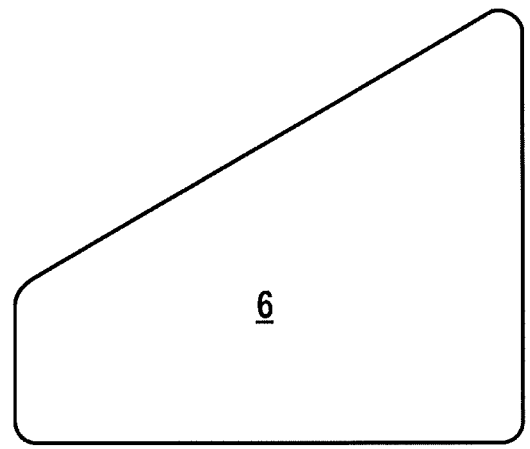
Fig. 9a　　　　　　　　　　Fig. 9b

TABLETOP

The invention relates to a tabletop as well as a table comprising a tabletop and a table substructure.

One of the most common pieces of furniture are tables which, for example, are often in use in schools or kindergartens. Particularly in schools, flexibility with respect to the arrangement of the tables is considered advantageous. Conventional teacher-centered frontal teaching methods on the one hand require the use of individual tables at which one or two students can sit facing the teacher. For group work, however, several tables are arranged side by side to form groups of 3, 4, 6 or even 12 students, for example. In the event of conventional tables having rectangular tabletops this is basically possible, but there is nevertheless a considerable amount of free space left between the tables, which in the end results in a relatively large distance existing between the students so that they do not sit facing each other in a way that promotes communication. Although tables featuring an irregular square/quadrilateral as tabletop have already been presented in the state of the art, these have neither turned out to be the ideal solution because it is not possible, for example, to arrange them as a group of 6 tables without gaps being created. Basically, large tables are also known of course which can accommodate 4, 6, 12 or even more people, but these are disadvantageous in that they do not allow satisfactory flexibility and are exclusively intended for group work due to an inflexible table size definition, i.e. such tables are unsuited for conventional frontal teaching. Contrary to this, single or double tables of classic rectangular shape are primarily intended for conventional frontal teaching. Similar problems as in the school sector also arise in other environments, for example in rooms where courses for adults are held, in conference rooms etc.

It is thus the objective of the present invention to provide a table respectively a tabletop that on the one hand can be used individually, but which allows the greatest possible flexibility in terms of arranging a different number of tables in groups, without wasting space unnecessarily, and in order to ensure that not too great a distance exists between the people sitting at a table.

As proposed by the invention, this objective is achieved by providing a tabletop which, when viewed from above, forms a polygon with at least four corners and at least four table edges, where two straight lines running along two table edges form an angle of 30° to each other,
two straight lines running along two table edges form an angle of 60° to each other, and
two table edges form an angle of 90° to each other.

Aside from this, the invention also relates to a table provided with a tabletop as proposed by the invention.

The invention is based on the fact that the provision of the angles referred to hereinbefore allows a particularly high degree of flexibility when arranging the tables provided with the inventive tabletop. For example, a second table of the same type can be placed at one of the table edges, where a straight line extending along the table edge forms a 30° angle with another straight line, i.e. with the table edge corresponding to the other table edge forming the 30° angle. This means that, as a result, the second table is turned by 30° in relation to the first table. This can be repeated for the third, fourth etc. table so that each table is turned by 30° in relation to the previous table. As 12 times 30° equals 360°, this results in a gapless circle of 12 tables so that typically one person can sit at each outer side of a table.

In case a second similar table is placed at a table edge for which a straight line extending along the table edge forms a 60° angle with another straight line, namely with the table edge corresponding to the other table edge forming the 60° angle, the second table is turned by 60° with respect to the first table. This is further reflected in the relation of the third to the second, the fourth to the third table, and so on. In the event 6 tables are arranged in this manner, again a complete circle of 6 times 60° equaling 360° is obtained, resulting in 6 tables being arranged in a circle without any noteworthy gaps existing between the table edges in contact with each other. Such a configuration cannot be achieved, for example, with irregular square tables that are known from the state of the art.

Other table configurations are of course conceivable as well. For example, 4 tables of the same type can be placed together such that the first table edge of the first table forming a 90° angle abuts the second table edge of the second table forming a 90° angle. In this way the second table is turned by 90° with respect to the first table. If a total of four similar tables are placed together in this way, a circle consisting of four tables is achieved. Group arrangements comprising 2 or 3 tables are also possible. It is also conceivable to arrange twelve tables to form an oval or to place individual tables in the middle of a circle of tables. If two quarter segments of the circle of 12 tables as described above, each consisting of three tables of the same type, are arranged oriented oppositely to each other and two further individual tables of the same type are added so as to supplement the arrangement, an oval group of tables comprising a total of eight tables is obtained.

To the extent it is defined in the invention that two straight lines extending along two table edges form a certain angle with respect to each other, this can mean that the table edges themselves exhibit this angle to each other when the respective table edges abut. However, it is just as well conceivable that the respective table edges do not abut directly, but only their imaginary extensions, in other words the straight lines that run along these table edges and thus extend the edges virtually. In this case a further table edge is usually created between the respective table edges; in other words, the tip of the tabletop forming a 30° or 60° angle is cut off at the point where said further table edge extends. It is also conceivable that more than one additional table edge is formed between the respective table edges.

Preferred in particular is a tabletop that forms a pentagon when viewed from above. A quadrilateral tabletop is also possible, in which case, however, one of the relatively acute angles of 30° or 60° is part of the tabletop itself. However, these tips of the tabletop are preferably cut off, which typically results in a pentagon shape.

Nevertheless, it is also conceivable in principle that the tabletop in top view has more than 5 corners, for example by providing one straight table edge of the pentagon with an additional corner, so that in total a hexagon shape is obtained. It goes without saying that the above mentioned prerequisites of having to form a 30° angle, a 60° angle and a 90° angle must be met.

Should the tabletop within the meaning of the invention be a pentagon when viewed from above, the table edges along which the straight lines extend forming a 30° angle to each other, can be designated as table edge 1 and table edge 2. These are typically the longest table edges where people usually sit when the table is used individually. Between these two table edges table edge 4 extends, i.e. the table edge formed by imaginarily cutting off the 30° tip.

The edges of the table along which the straight lines run and which form a 60° angle to each other, can be designated as table edge 2 and table edge 3 in the event of a pentagon configuration. In other words, as one of the typically long table edges, table edge 2 is identical to one of the table edges forming the 30° angle. The usually quite short table edge 5 is located between the table edges 2 and 3, accordingly, said table edge 5 is formed by imaginarily cutting off the 60° tip.

Likewise, in a pentagon configuration the 90° angle is formed by table edges 1 and 3.

All in all, this means that the formation of a circle of 12 tables requires table edge 2 of the first table to be placed against table edge 1 of the second table, etc., with the persons positioned around the outside of the table circle thus sitting at table edges 3.

In the case of a circle of 6 tables, the table edge 3 of the first table is placed against the table edge 2 of the second table, and so on. The persons positioned outside around the table circle thus sit at the table edges 1.

In the event of a circle comprising 4 tables, table edge 1 of the first table is placed against table edge 3 of the second table, etc., so that the persons positioned around the outside of the table circle thus sit at table edges 2.

Therefore, in the typical table arrangements, of table edges 1, 2 and 3 two table edges are each placed next to each other, while the remaining table edge is the edge where a person can sit. This also takes into consideration that table edges 1, 2 and 3 are the longest table edges as a rule, while table edges 4 and 5 are usually shorter in length.

As per a preferred embodiment, the polygon has a 150° angle. This is usually the angle between table edges 2 and 5 referred to hereinbefore. Moreover, the polygon can have a second 90° angle, which as a rule is the angle between table edges 3 and 5. The corner forming a 150° angle and the corner forming the second 90° angle may be arranged so as to be adjacent to each other. Lastly, the two corners forming the first and second 90° angle can also be adjacent to each other. In the case of a pentagon designed in this way, the angles of 30° or 60° which are the basis of the invention result quasi automatically through the extension of the corresponding table edges. In this way it is also ensured that, for example, when a group arrangement of 12 tables is provided, straight sides are formed on the outside of the table circle where a person can sit facing the middle of the circle of tables.

The corners of the polygon need not be pointed but may be designed so as to be rounded. This is even preferable due to the fact that a certain rounding of the corners will reduce the risk of injury, which is particularly important in the school sector. The respective angle formed at a rounded corner shall be understood to be the angle between the lines representing the extensions of the table edges abutting in the corner. The degree of the rounding of the table edge can be provided as considered appropriate. For example, radii between 20 and 120 mm are advantageous for the rounded corners.

Table width shall be understood to be the longest possible width of the table or tabletop. In the preferred embodiment described hereinbefore, this corresponds to table edge 1, which is usually the edge where the chairs are arranged when the table is used in single position. The table width is preferably in a range of between 65 and 100 cm, preferably between 80 and 90 cm.

In so far as reference is made to angles in this patent application, it is to be noted that the angles may have a certain tolerance without departing from the scope of protection of the patent. Angle indications with deviations in the range of ±5° are regarded as still being covered by the angle specification, i.e. even angles ranging between 25° and 35° are regarded as a 30° angle according to the invention, angles ranging between 55° and 65° as a 60° angle and angles between 85° and 95° as a 90° angle.

It is also possible for one or more edges of the tabletop not to have a straight configuration, but being of curved, arched or some other special shape.

In addition to the tabletop itself, the invention also relates to a table with a tabletop as described above as well as a table substructure. The substructure of the table may basically be designed in any desired way, for example comprising individual table legs, having a single centrally mounted table leg with a wide footprint or being of similar design.

The invention as well as the technical environment are exemplarily described hereunder in sufficient detail on the basis of the figures. It is to be noted that the figures show an especially preferred embodiment variant of the invention. However, the invention shall not be deemed as being limited to the embodiment variant shown. To the extent it is technically expedient, the invention comprises, in particular, any optional combinations of the technical features that are stated in the claims or in the description as being relevant to the invention.

Elucidation of the invention is provided by the following figures where

FIG. 8*a,b* show in top view the schematic representation of two variants of a tabletop according to the invention, and FIG. 9*a,b* show in top view the schematic representation of two further variants of a tabletop according to the invention.

Figure 1:
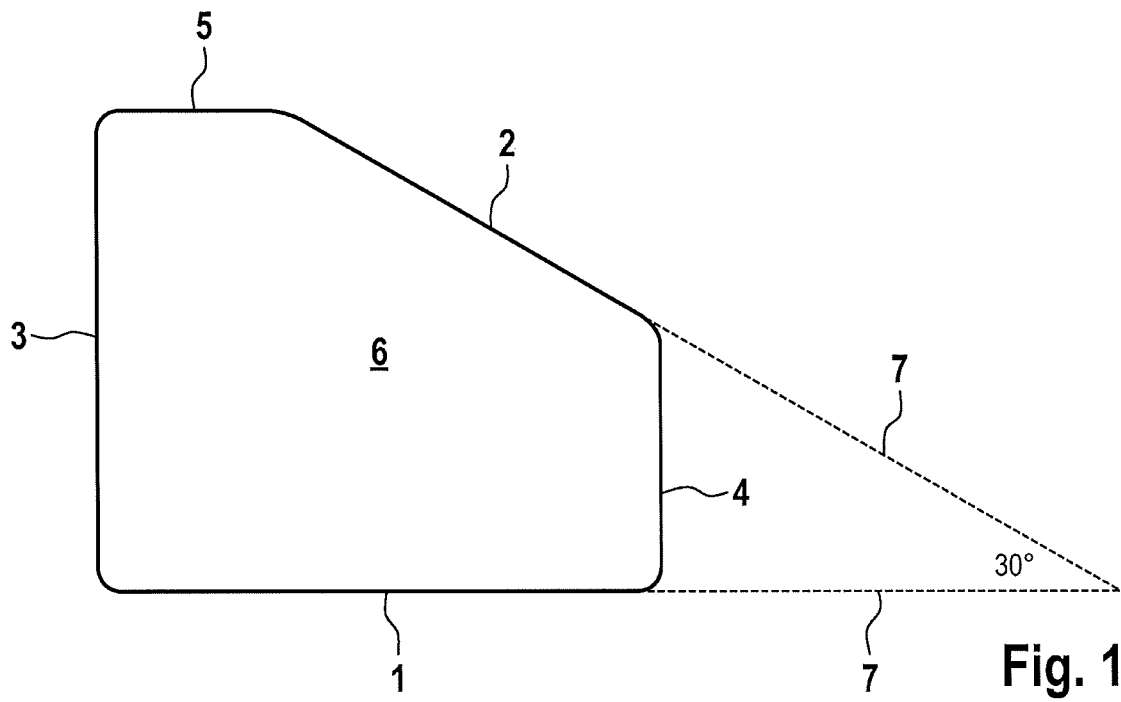
FIG. 1,2,3 illustrate as a top view the schematic representation of a tabletop proposed by the invention.

FIG. 1 shows in plan view the tabletop 6 to which the invention relates. The tabletop has been equipped with five rounded corners and five table edges 1, 2, 3, 4 and 5. The straight lines 7, which are an extension or elongation of the table edges 1 and 2, form an angle of 30° relative to each other. In the lower left corner, table edges 1 and 3 meet at a 90° angle. In the example shown, the tabletop has two further 90° angles, but these are not obligatory. The three 90° angles are adjacent to each other. Table edge 1 is the edge of the table where a person usually sits when the table is used individually. All the table edges 1, 2 and 3 are longer than table edges 4 and 5 and are therefore preferably used for sitting and for the placement of a chair. Table edge 4 is the edge of the table that results from imaginarily cutting off the dotted tip shown on the right, which has a 30° angle. The width of the individual table edges is variable.

Figure 2:
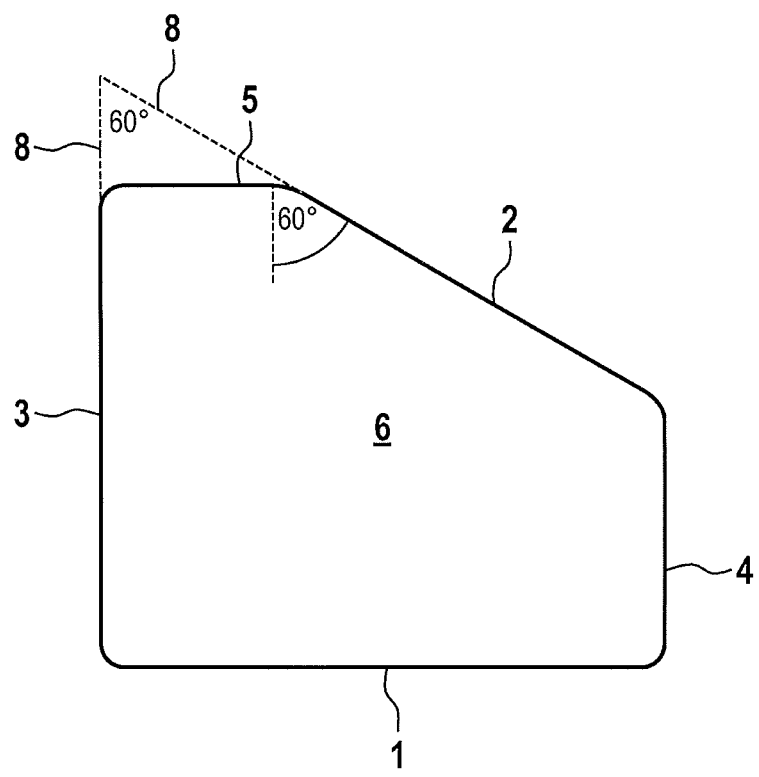

FIG. 2 corresponds to the illustration in FIG. 1, but in this case the focus is on the 60° angle that is formed by the two straight lines 8, which represent an elongation of table edges 2 and 3. Table edge 5 is the edge of the table that results from imaginarily cutting off the dotted tip shown on the top left side, which has a 60° angle. In the present case, a 150° angle exists between the table edges 2 and 5.

Figure 3:
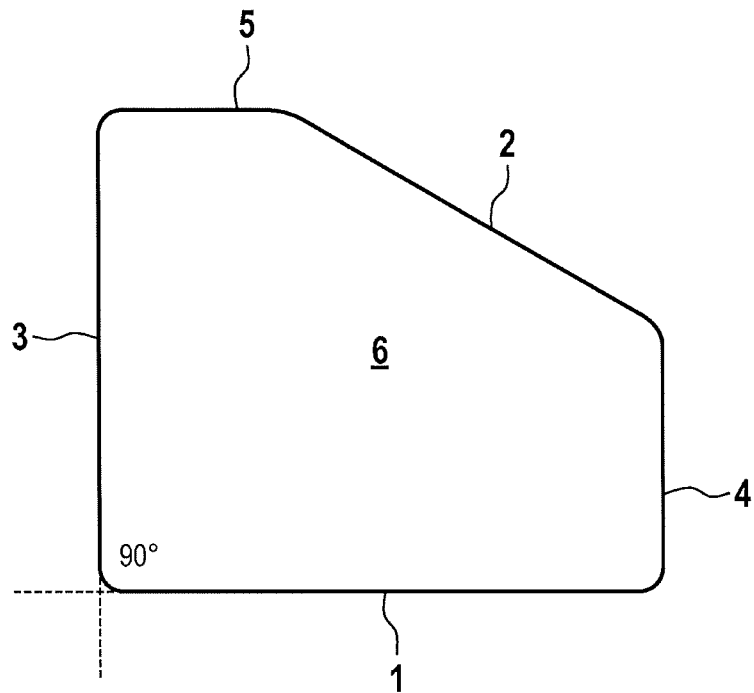

FIG. 3 corresponds to the illustration in FIG. 1, but in this case, emphasis is on the representation of the 90° angle that is formed by the two table edges 1 and 3.

Figure 4:
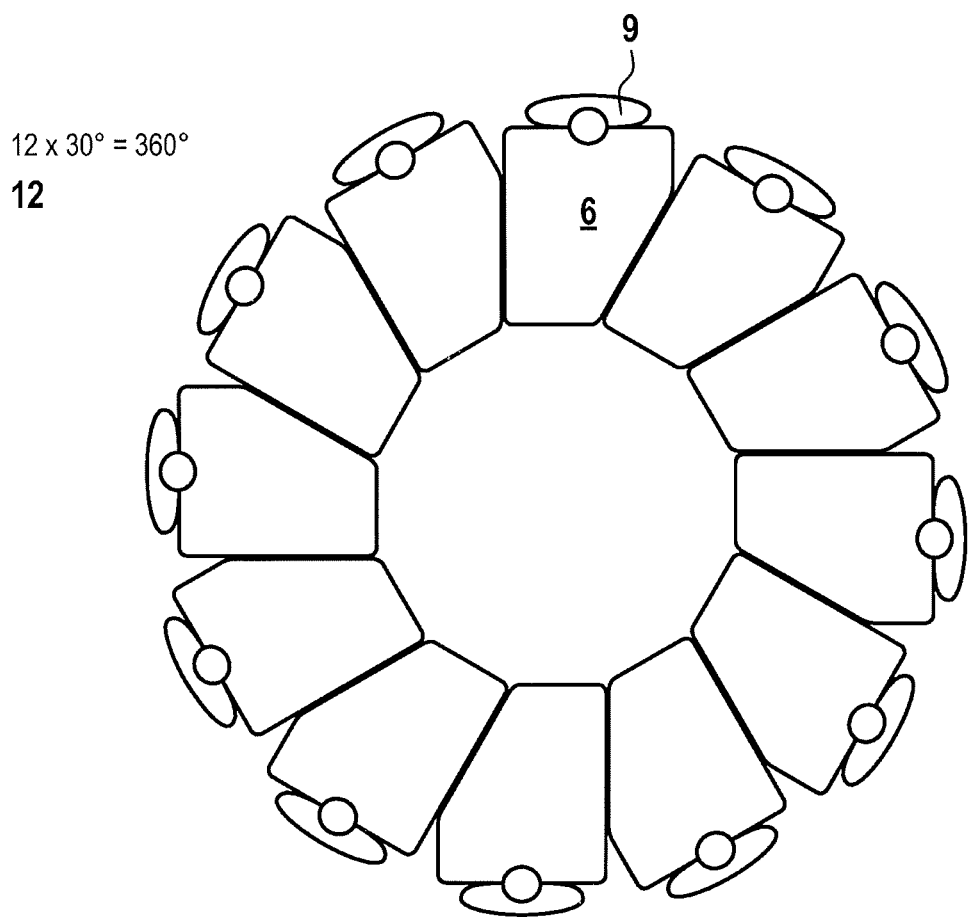
FIG. 4 illustrates as a top view the schematic representation of a 12-piece combination of the inventive table.

In FIG. 4 a combination of 12 tables is shown. In this grouping of tables, the table edge 2 abuts on the table edge 1 of the next table. As depicted in FIG. 1, the extensions/elongations of these two table edges 1, 2 form a 30° angle; accordingly, this results in an offset of 30° each of the individual tables arranged side by side. When 12 tables are combined in this way, this again results in a complete circle of 12×30°=360°. Additionally, the 12-table combination offers the additional advantage that people 9 can each sit at the table edge 3 with a view to the middle of the circle. Of course, the tabletops 6 can each be used in mirrored arrangement as well, in which case only the "direction of rotation" of the circle of tables would change.

Figure 5:
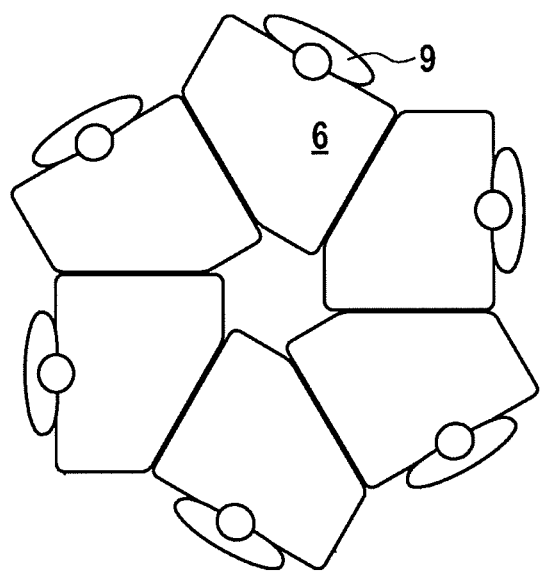
FIG. 5 illustrates as a top view the schematic representation of a 6-piece combination of the inventive table.

FIG. 5 is a top view representation of an arrangement of a 6-table grouping according to the invention. The tabletops 6 are placed abutting each other in a way that one table edge 3 is positioned adjacent to edge 2 of the next table. As depicted in FIG. 2, the elongations of these two table edges 2, 3 form a 60° angle; accordingly, this results in an offset of 60° each of the individual tables arranged side by side. Accordingly, each table is turned by exactly 60° in relation to the previous table. By combining 6 tables in this way, a complete circle of 6×60°=360° is formed. Persons 9 are sitting at the edge 1 of the tables with a view to the middle of the circle of tables.

Figure 6:
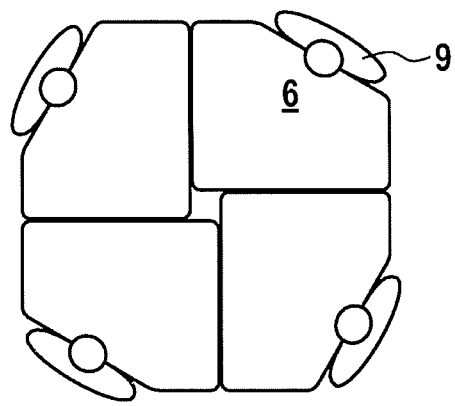
FIG. 6 illustrates as a top view the schematic representation of a 4-piece combination of the inventive table.

FIG. 6 is a top view representation of an arrangement of a 4-table grouping as proposed by the invention. Tabletops 6 are placed abutting each other in such a way that one table edge 1 each is positioned adjacent to edge 3 of the next table. As shown in FIG. 3, these two table edges 1, 3 form a 90° angle; accordingly, this results in an offset of 90° each of the individual tables arranged side by side. Each table is thus turned by exactly 90° relative to the previous table. By combining four tables in this way, a complete circle of 4×90°=360° is formed. Persons 9 are sitting at the edge 2 of the tables with a view to the middle of the circle of tables.

Figure 7:
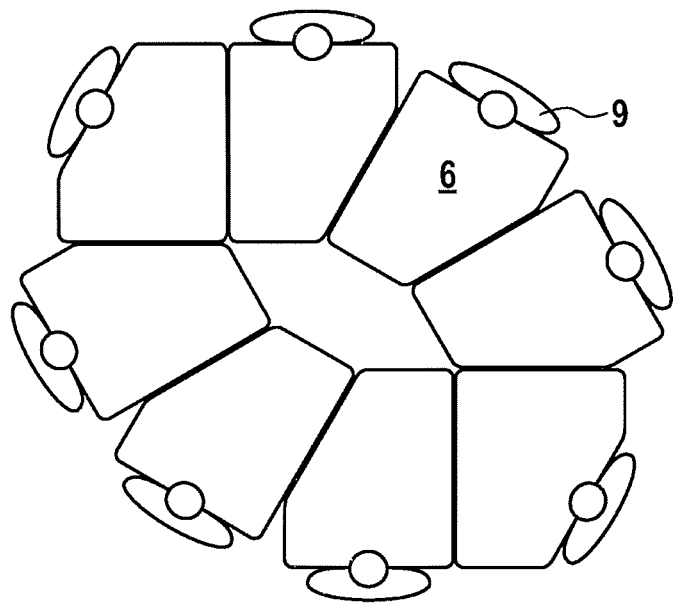
FIG. 7 illustrates as a top view the schematic representation of an 8-piece combination of the inventive table.

In FIG. 7 a combination of 8 tables is shown, in which two quarter segments of a hereinbefore described combination of 12 tables are used, each consisting of three tables, with two individual tables being additionally included in the group at right angles. This arrangement forms an oval which enables 8 people to be seated.

FIGS. 8a and 8b are schematic top view representations of the tabletops 6 provided by the invention. It is a matter of course that the principle on which the present invention is based is equally applicable to the corresponding mirror image of a tabletop; depending on the table circle formed, only the "direction of rotation" of the arrangement of the tables placed next to each other will change. However, for the majority of right-handed people the variant according to FIG. 8a is preferred; tabletops shown in FIG. 8b are more suitable for left-handed people.

Finally, a quadrilateral version of the tabletop 6 is illustrated in FIGS. 9a and 9b. This variant ultimately results from the fact that the left or right upper tip of the pentagonal tabletop represented in FIG. 8a or 8b is not cut off along a table edge 5. Accordingly, table edges 2 and 3 themselves form a 60° angle. Such a quadrilateral table can be used as well in the same way as described herein.

The invention claimed is:

1. Tabletop which, when viewed from above, is a polygon with at least four corners and at least four table edges, said tabletop comprising;
    two straight lines, which run along two table edges, form an angle of 30° relative to each other,
    two straight lines, which run along two table edges, form an angle of 60° relative to each other, and
    two table edges form an angle of 90° relative to each other.

2. Tabletop according to claim 1, wherein between the table edges along which the straight lines extend that form a 30° angle, there is at least one further table edge.

3. Tabletop according to claim 1, wherein between the table edges along which the straight lines extend that form a 60° angle, there is at least one further table edge.

4. Tabletop according to claim 1, wherein the polygon is a pentagon.

5. Tabletop according to claim 1, wherein the polygon exhibits a 150° angle.

6. Tabletop according to claim 5, wherein the corner forming one 150° angle and the corner forming the second 90° angle are adjacent relative to each other.

7. Tabletop according to claim 1, wherein the polygon exhibits a second 90° angle.

8. Tabletop according to claim 7, wherein the corners forming the first and the second 90° angle are adjacent relative to each other.

9. Tabletop according to claim 1, wherein one or several corners of the polygon are rounded.

10. Table, comprising a tabletop according to claim 1 and a table substructure.

* * * * *